United States Patent [19]

Moerman

[11] 4,162,441
[45] Jul. 24, 1979

[54] APPARATUS FOR CONTROL OF DC POWER BY ELECTROMAGNETIC INDUCTION

[76] Inventor: Nathan A. Moerman, 7310 Maple Ave., Chevy Chase, Md. 20015

[21] Appl. No.: 848,979

[22] Filed: Nov. 7, 1977

Related U.S. Application Data

[62] Division of Ser. No. 762,896, Jan. 26, 1977, Pat. No. 4,112,347, which is a division of Ser. No. 635,007, Nov. 25, 1975, Pat. No. 4,020,440.

[51] Int. Cl.² ............................ G05F 1/22; G05F 7/00
[52] U.S. Cl. ........................................ 323/57; 323/48; 363/15; 323/20
[58] Field of Search .................. 363/15, 32, 65, 75, 363/76; 323/6, 48, 60, 61, 89 R, 44 R, 57, 20

[56] References Cited

U.S. PATENT DOCUMENTS 2,714,188   7/1955   Scherer ................................. 323/6
3,372,283   3/1968   Jaecklin .............................. 323/48

OTHER PUBLICATIONS

*IBM Tech. Disc. Bull.* vol. 19, No. 12, May 1977, pp. 4650–4651, "Dual-Control Regulator" by Hoffman, Jr.

*Primary Examiner*—Gerald Goldberg
*Attorney, Agent, or Firm*—Thomas O. Maser

[57] ABSTRACT

Apparatus for control of direct current by means of systematic switching and progressive variation of magnetic flux in associated magnetic paths. Subdivision of the input DC power between two transformer devices permits transformation by controlled electromagnetic induction into stabilized outputs which may be recombined into continuous DC power at controlled voltage or current levels.

2 Claims, 2 Drawing Figures

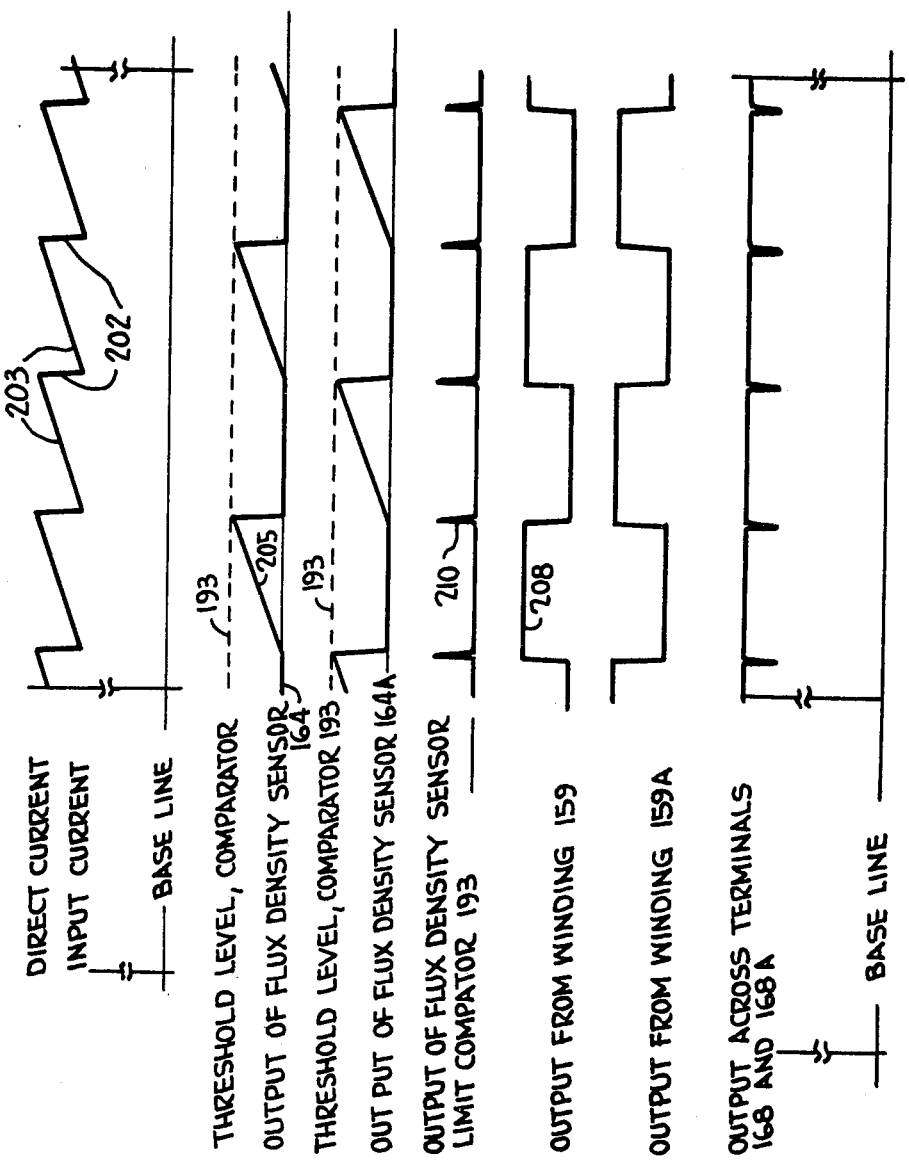

APPARATUS FOR CONTROL OF DC POWER BY ELECTROMAGNETIC INDUCTION

GOVERNMENT USE

The invention described herein may be manufactured and used by or for the government of the United States of America for governmental purposes without the payment to me of any royalties thereon.

This is a division of application Ser. No. 762,896 filed Jan. 26, 1977 now U.S. Pat. No. 4,112,347, which, in turn, was a division of application Ser. No. 635,007 filed Nov. 25 1975, now U.S. Pat. No. 4,020,440.

RELATED PATENT

This invention is closely related to my U.S. Pat. No. 4,020,440 issued Apr. 26, 1977, which is incorporated by reference.

FIELD OF THE INVENTION

This invention relates to the field of control of electrical energy, and more specifically to DC/DC power conversion by static magnetic means.

SUMMARY

Control of magnetic flux in a closed magnetic path is accomplished by the progressive control of permeance in an assigned section of the path. Several configurations for continuous permeance control by progressive saturation and/or domain rotation are described in my related U.S. Pat. No. 4,020,440.

Utilizing this technology, I have developed a unique apparatus for the control of DC/DC power conversion by purely static magnetic means. More specifically, in a direct to direct current power converter, two identical permeance controlled direct current power pulse transformers are alternately switched, in a predetermined time sequence, to subdivide the input direct current power into a stream of direct current power pulses. Each of these power pulses is modified, through the controlled electromagnetic induction in the output winding of the pulse transformers to derive the desired output voltage or current. Continuous direct current power is reconstituted by combining the outputs of the two transformers. The transformation ratio between input and output is primarily a function of the primary and secondary turns ratio as in standard transformers. The output is further modified and stabilized by the activated permeance control in a feedback system. Control flexibility, afforded by the feedback system, enables not only stabilized output amplitude control but also direct current pulse waveforms of variable characteristics.

It is, therefore, an object of this invention to provide electrical power control by controlled electromagnetic induction.

A still further object of this invention is to provide controlled electromagnetic induction means for direct to direct current power conversion and control.

A still further object of this invention is the elimination of moving parts and electrical controlling elements which have current and/or voltage limitations and fixed forward voltage drops.

A further object of this invention is the coupling to direct current sources and conversion to a power form for end utilization.

Still another object of this invention is the coupling of electric power from one operating level of voltage or current to another level.

Another object of this invention is to reduce size and weight of electrical conversion and control structures by the generation, conversion and control of high frequency electrical power.

A still further object of this invention is to provide an electric power control means responsive to a sensed physical state, such as: voltage, current, power, temperature, pressure, strain, humidity, acidity, or the like.

Another object of this invention is to provide control of electrical power by electronic control of magnetic means in static configurations.

Yet another direct object of this invention is to provide switching of electrical circuitry without the use of mechanical switches.

An object of this invention is the control of current in direct current circuits by commutated reactors with minimum power loss in the control means.

An object of this invention is to provide the means for the computer control of power subsystems in an electric power network.

Still another object of this invention is to provide means for control of voltage, current, and phase of a power subsystem of an electrical power network.

BRIEF DESCRIPTION OF THE DRAWINGS

FIG. 2 is a time sequence chart for the operation of the converter of FIG. 1.

DESCRIPTION OF A PREFERRED EMBODIMENT

Figure 1:
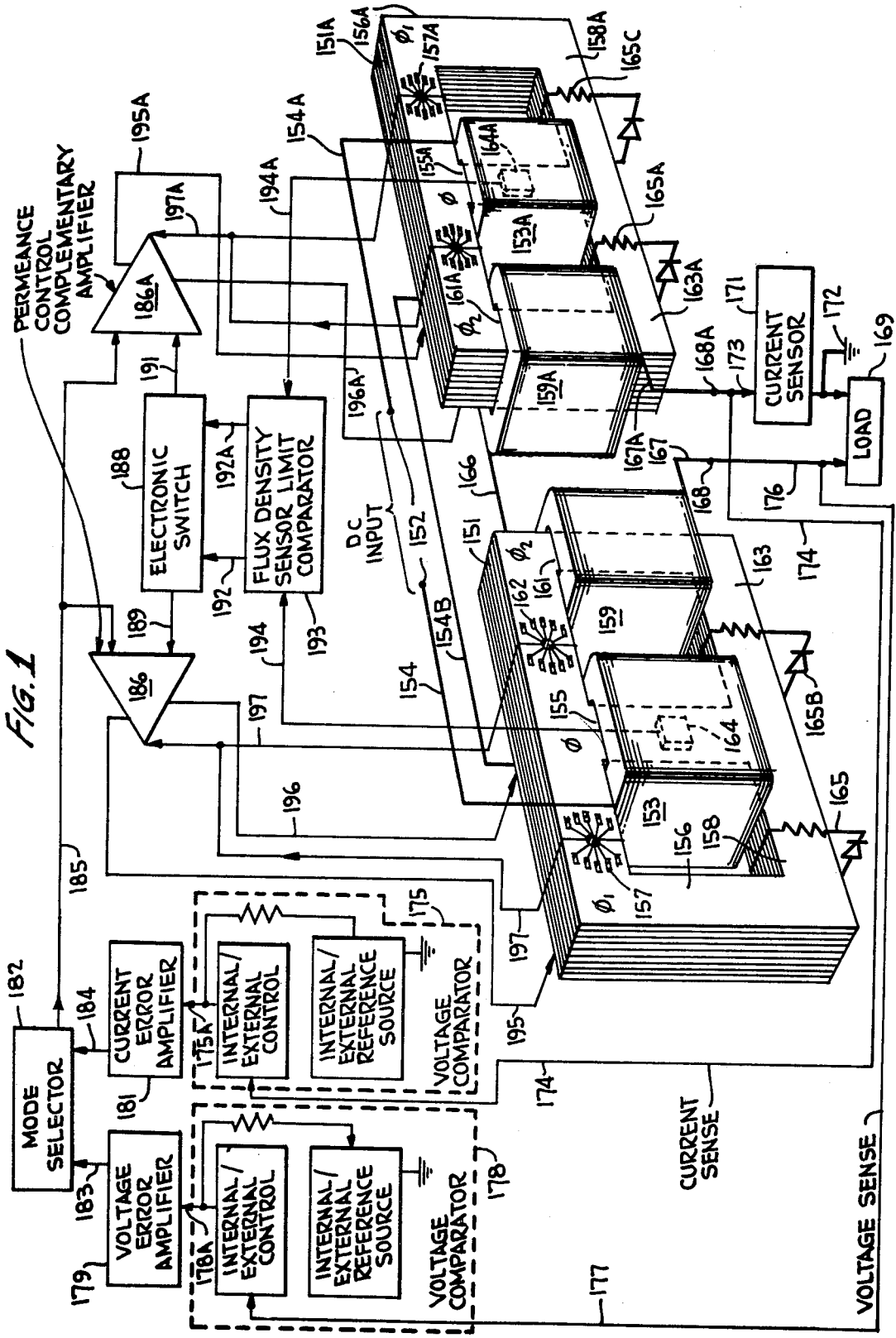
FIG. 1 shows a direct to direct current power converter.

FIG. 1 shows the direct to direct current converter of this invention. Two identical three-legged magnetic cores 151 and 151A are used to provide for the subdivision of direct current input power into a series of direct current power pulses by means of alternated operation between the two identical magnetic structures. The subdivision of input direct current power in this way enables the distribution of power pulses first within one core then the other alternately, so that the net effect is that an alternating sequence of control between the two structures effects control of direct current power continuously.

The power control flexibility inherent in the feedback circuit enables not only the stabilization of a preset output voltage or current but also the dynamic excursion of output voltage or current under the control of an external programming signal. This may yield unidirectional pulse waveforms of varying duty cycle and wave shape.

A direct current source of any voltage, current level or source impedance can be connected to input terminals 152. Serially connected to the input terminals 152 are input windings 153 and 153A through leads 154, 154A and 154B, respectively. Input winding 153 is mounted on center leg 155 of core 151 and input winding 153A is mounted on center leg 155A of core 151A. Bypass leg 156 of core 151 and bypass leg 156A are connected to the input legs 155 and 155A, respectively, by permeance control sections 157 and 157A, respectively, at one end of each thereof and through return sections 158 and 158A, respectively. Output winding 159 is mounted on output leg 161 of core 151 and output winding 159A is mounted on output leg 161A or core 151A. Output leg 161 is connected to input leg 155 through permeance control 162 at one end thereof of each and through return path 163 at the other end thereof. A flux density sensor 164A is mounted intimately on leg 155A within winding 153A. Reverse transient suppressor 165 is mounted on return section 158, reverse transient suppressor 165A is mounted on return section 163A, reverse transient suppressor 165B is mounted on return section 163, and reverse transient suppressor 165C is mounted on return section 158A.

Output windings 159 and 159A are connected so as to be serially aiding through connector 166 and leads 167 and 167A from windings 159 and 159A to output terminals 168 and 168A, respectively. The load 169 is connected to the output terminals 168 and 168A. A current sensor 171 is connected between terminal 168A and the ground side of the load 169 as indicated by ground 172. Lead 173 connects the ground side of output terminals 168A and current sensor 171. Connected to lead 173 is a current sense lead 174 which is connected at its other end as the input lead to a current sense voltage comparator circuit 175. A lead 176 is connected between the high potential side of output terminal 168 and the load 169. Connected to lead 176 is a voltage sense lead 177 which is connected at its other end as the input lead to a second voltage comparator circuit 178.

The voltage comparator circuits 175 and 178 provide error signals that represent the deviations of feedback voltage or current sense voltage from an external or internal reference. The error signal from the voltage sense comparator 179 is connected as the input to the voltage error amplifier 179 and the error signal from the current sense comparator 175 is connected as the input to the current error amplifier 181. The voltage comparators 175 and 178 can be of configuration or design well established in the state-of-the-art. A mode selector 182 has for its inputs the output of voltage error amplifier 179 through connector 183 and the output of current error amplifier 181 through connector 184.

The mode selector 182 selects which of the voltage comparators 178 or 175 will provide feedback control to the permeance control complementary amplifiers 186 and 186A. The output of the mode selector 182 is connected through connector 185 as the input common to both permeance control complementary amplifiers 186 and 186A. The output of an electronic switch 188 is connected through connector 189 as a second input to permeance control complementary amplifier 186 and through connector 191 as a second input to permeance control complementary amplfier 186A. The inputs to the electronic switch 188 are connected through connectors 192 and 192A from flux density sensor limit comparator 193. The inputs to the flux density sensor limit comparator 193 are from flux density sensor 164 through connector 194 and from flux density sensor 164A through connector 194A. The outputs of permeance control complementary amplifier 186 are the energizing leads 195 and 196 and the common return leads 197A.

OPERATION OF THE DIRECT TO DIRECT CURRENT CONVERTER IN FIG. 1

The control of direct current power in the conversion process is accomplished by treating the continuous stream of direct current power as a contiguous series of direct current power pulses, each of which can be controlled in a transformer-like structure. The embodiment of this concept is shown in FIG. 1 with control amplifiers 186 and 186A connected to identical structures 151 and 151A comprising the power pulse transformers which are alternately switched to sustain direct current power flow. A series connection of input windings, i.e., primaries, permits the exchange of energy flow between the two structures through the alternated permeable magnetic core paths associated with the respective input windings. The direct current thus converted is the combination of direct current power pulses alternately controlled between the two structures and reconstructed into a continuous direct current power flow by the series aiding connection of the output windings, i.e., secondaries, at predetermined voltage or current levels.

In the conversion process, each power pulse transformer is subjected to three operating states, namely: active, transitional, and inactive.

Active state. The permeance of the magnetic core is at its maximum and direct current energy is transferred between input 152 and output winding 159 in a pulse period determined by the rising flux amplitude to a point in time where the permeability of the core will decrease.

Transitional state. The onset of the transfer between power pulse transformers which is initiated by the flux density limit sensor 193 associated with the previously active power pulse transformer, which is now switched off magnetically by reducing core permeance to a minimum through saturation of both permeance control section 157 and 162. At this time, the previously inactive power pulse transformer is activated by unsaturating its respective permeance control sections and allowing them to be subjected to the control currents dictated by the feedback system to produce the required output voltage and/or current level. In this period, most of the magnetic energy stored in the previously activated core structure is absorbed and dissipated by the associated reverse transient suppressor. The residual transient across the output winding can be further attenuated by an appropriately polarized rectifier across the output winding terminals.

Inactive state. In the inactive state, the power pulse transformer is rendered ineffective by the reduction of permeance in its core by the current saturation of its permeance control sections. The reduced permeance of the structure results in a low value of inductance for both its primary and secondary windings, thereby not inhibiting appreciably the flow of power through the active power pulse transformer. The low impedance of the inactive transformer windings act, in effect, to clamp the active winding to the power source or load. In some applications a more effective clamping action is provided by active switching elements for the primary windings and clamping rectifiers for the secondary windings.

At the onset of the inactive state, the magnetization of the core drops from a near saturated state to a reverse residual value induced by the counter magnetomotive force generated by the current through the reverse transient suppressor and the load currents through the input and output windings. This is a desirable effect since it increases the flux excursion from the onset of the active state. A unique operating characteristic is afforded by the continuous control capability throughout the active period, including the time rate of turnon and turnoff. This is in contrast to the uncontrolled operation of currently used power switching devices, such as mercury-arc rectifiers and silicon controlled rectifiers, as used in prior art power conversion systems. These devices are turned on by a triggering signal, and rapidly reach maximum conduction, and remain in this state until current is removed by external means.

With the aid of the time sequence diagram of FIG. 2, the operation details are presented. Direct current power input voltage across terminals 152 produces a direct current input current 201 comprising a sawtooth waveform 202, 203 displaced, by the reflected load current, from a base line. The direct current input 201 is a composite waveform representing the serial addition of the input winding current generated alternately between the power pulse transformers 151 and 151A. Just prior to the switching transition between transformers, the rising current portion 203 is at its maximum value. At the point of transition between transformers, the current drops abruptly over path 202 and represents the onset of the high permeance, unmagnetized transformer structure that has at this time been switched to the active state. The counter electromotive force developed in the input winding 153 determines the lower current point from which the current rises over path 203 to a maximum current value, again representing the near saturated condition of the active magnetic core, at which point a switching transition occurs. The rising current 203 is the magnetic core magnetizing current which is superimposed on a direct current level representative of the reflected output load current.

The gradual rise in current 203 in the input winding of the active power pulse transformer produces a corresponding rise in magnetic flux in the associated core center leg, which is subdivided between the output path and bypass path as dictated by the apportioning complementary amplifier under the control of the feedback system. The controlled rising flux in the first output path 204, 205 is linked with the output winding 159 to induce a direct current pulse 208 in the output winding 159 that appears at the output terminals through the low impedance of winding 159A. Concurrent with the active state of structure 151 is the inactive state of 151A. The output flux path 200, 207 shows no appreciable flux change since the core permeance is maintained at its maximum value, and the output winding in this period has no appreciable induced output voltage 209.

The rising flux over path 105 is limited in its maximum value by the flux density sensor limit comparator 193 which signals the state of near saturation in the active core 151 by producing transition switching signal 210 to initiate the transition between the two power pulse transformers. The time period for the flux excursion over path 205 is directly related to the size and magnetic characteristic of the magnetic structure. For a reduced excursion time and, consequently, the size and weight of the magnetic structure is proportionately reduced.

That portion of the total flux excursion in the input path 155 of core 151, for example, transferred to the output leg 161, induces a voltage in the associated output winding 159 in response to the preset condition established by the feedback circuit.

In the transitional state, the magnetic flux stored in the active core represents stored energy that is to be dissipated. The drop in flux at this time would occur abruptly in a fast switching action and produce thereby an undesirably large induced reverse voltage transient in the output circuit. To reduce this transient effect, two devices are employed: first, the reverse transient suppressor winding with diode 165 to absorb and dissipate a portion of the stored magnetic energy, reducing the transient in the output and input circuits; and second, the controlled turnon and turnoff time of the two power pulse transformers over a crossover path to minimize the rate of flux decrease, and consequently, the amplitude of the induced reverse voltage transient. The voltage output to the load will, therefore, be a uniform direct current level with small reverse spikes marking the points of transition. These transient pulses are of small consequence since they are diminished by external filtering, or by the natural filtering of the power distribution circuits.

Replacing the direct current reference voltage source in voltage comparators 178 and 175 with an external reference signal, the output power at terminals 168 and 168A can be generated in the form of unidirectional power pulses of varying duty cycle and waveform. Furthermore, these excursions of power may be in the form of controlled voltage or controlled current. This may also be achieved by programmed external voltage or current controls in the respective voltage comparator circuits 175 and 178.

Response of the feedback circuit to output variations or switching excursions would normally be limited by the time lag introduced through the inductance of the control winding of the permeance control section. However, the design of the drive amplifier, using established techniques, is configured with a constant current control characteristic which affords a high dynamic resistance to greatly diminish the ratio of circuit inductance to resistance, or time constant, of the permeance control drive circuit. This permits design flexibility in the control of response time to satisfy specific requirements.

In this invention a dual combination of controlled electric power transforming devices are commutated to permit the subdivision of direct current power between the transforming devices into direct current power pulse form. In this form, the direct current power can be transformed by controlled electromagnetic induction into predetermined stabilized output levels. The merging of the direct current power pulses at the output of the dual combination of transforming devices restores the continuous flow of direct current power. This output may be further modified by internal and/or external control into a variable amplitude waveform or a programmed step change of amplitude and/or pulse duty cycle.

The conversion and control flexibility of this invention permits the implementation of large scale direct current power transmission and distribution networks. Remotely programmable output of these power interfacing devices enables highly efficient direct current power switching by time phased momentary suppression of output, during circuit breaker operation.

In direct current utilization devices, such as traction and vehicle drives, this invention permits uninterrupted variation of power to the direct current drive motor with a minimum loss of power in the controlling means. This is in contrast to the pulse-time controls using electric switching devices and power consuming rheostats.

The combination of direct current power subdivision into direct current power pulses and controlled electric induction, both achieved by the switching and progressive control, respectively, of magnetic circuit permeance in transformer-like structures, as described in this invention, is a pioneering technology for direct current power systems. With these principles and the previously described structures for direct current overcurrent suppression and direct current power circuit switching, the wholly unexplored area of direct current power transmission and distribution in network configurations is now possible.

In a generalized direct current to direct current power converter, direct current power from any source is transformed to direct current power at any selected and stabilized voltage or current, and continuously adjustable below preestablished limits. In addition, unidirectional power pulse generation of varying duty cycle and frequency is a capability of this generalized converter. The invention described herein uniquely satisfies these requirements for a generalized direct to direct current converter by employing a pair of permeance controlled power pulse transformers in a commutated mode. The subdivision of input direct current power into consecutive power pulses by this means enables the controlled electric induction in the respective power pulse transformers, the outputs of which are combined to yield the desired output direct current power form. A feedback system to control the pulse transformer pair contains a stabilizing reference voltage and means for output adjustment or modulation by internal or external devices.

I claim:

1. In an electromagnetic induction means for the transformation of one form of direct current power to another form of direct current power:
    a first and a second identical means for providing a plurality of variable permeance closed magnetic paths;
    each of said identical means having an input path means, an output path means, a bypass path means, an input winding means on said input path means, an output winding means on said output path means, a first electromagnetically coupled variable permeance control means between said input path means and said output path means, a second electromagnetically coupled variable permeance control means between said input path means and said bypass path means,
    a pair of direct current source terminal means,
    a means connecting said first and second input winding means in series with said pair of direct current source terminal means,
    a current sensing means,
    a first and a second output terminal means,
    a means connecting said first output terminal means, said first and second output winding means, said current sensing means and said second output terminal means in series aiding configuration,
    a first, second, third and fourth reverse transient suppression means, each having a winding means, a unidirectional current flow and energy absorbing means and means connecting said winding means to said flow and absorbing means,
    said first suppression means surrounding said bypass path means of said first identical means,
    said second suppression means surrounding said output path means of said first identical means,
    said third suppression means surrounding said bypass path means of said second identical means,
    said fourth suppression means surrounding said output path means of said second identical means,
    a first voltage comparator means having a reference voltage means and an output voltage setting means producing a voltage error output signal,
    a voltage feedback means connecting said first output terminal means and said first voltage comparator means,
    a second voltage comparator means having a reference voltage means and an output current setting means producing a current error output signal,
    a current feedback means connecting said second output terminal means and said second voltage comparator means,
    an operating mode selector means,
    a means connecting the voltage error signal output of said first voltage comparator means as a first input to said operating mode selector means,
    a means connecting the current error signal output of said second voltage comparator means as a second input to said operating mode selector means,
    a first and a second complementary control amplifier means,
    a means connecting the output of said operating mode selector means as the first input to both of said amplifier means,
    means connecting the complementary control outputs of said first amplifier means to said first and second variable permeance control means in said first identical means,
    means connecting the complementary control outputs of said second amplifier means to said first and second variable permeance control means in said second identical means,
    a first flux density sensing means magnetically coupled to said input path means of said first identical means,
    a second flux density sensing means magnetically coupled to said input path means of said second identical means,
    a flux density sensor limit comparator means,
    an electronic switch means having a first and a second alternately operating output means,
    means connecting the output of said first flux density sensor as one input to said flux density sensor limit comparator means,
    means connecting the output of said second flux density sensor as a second input to said flux density sensor limit comparator means,
    means connecting the output of said flux density sensor limit comparator means as the controlling input to said electronic switch means,
    means for connecting said first output of said electronic switch means as a second input to said first amplifier means,
    means for connecting said second output of said electronic switch means as a second input to said second amplifier means,
    whereby said voltage and current error signals enable the amplifier means to provide stabilization control for the contiguous direct current pulse power,
    said amplifiers alternate the minimum permeance state and the variable permeance state between said first and second identical means in response to the output of said flux density limit comparator means being a switching input to said electronic switch means which enables alternate ones of said first and second amplifier means, the degree of permeance control provided to said first and second electromagnetically coupled variable permeance control means being a function of the said error signals.

2. In a direct to direct current converter, a first and a second identical electrical power pulse transformer each having a plurality of variable permeance closed magnetic paths, an input winding and an output winding, a direct current input connected to said input windings, permeance control means for enabling first one and then the other of said transformers to alternately route direct current pulses therethrough, an output serially connecting said output windings, means for comparing the signal at said output with a reference to produce voltage and current error signals, means for providing a selected one of either said voltage or current error signal to said permeance control means to control said output.

* * * * *